United States Patent
Beasley (10) Patent No.: US 6,227,928 B1
(45) Date of Patent: May 8, 2001

(54) FIXTURE, PROCESS AND KIT FOR MAKING A GAME CALL

(76) Inventor: Joseph S. Beasley, HCR 67 Box 84, Summersville, MO (US) 65571

( * ) Notice: Subject to any disclaimer, the term of this patent is extended or adjusted under 35 U.S.C. 154(b) by 0 days.

(21) Appl. No.: 09/457,793

(22) Filed: Dec. 9, 1999

(51) Int. Cl.[7] ................. A63H 5/00; B25B 9/00
(52) U.S. Cl. ............ 446/207; 269/152; 29/281.1; 206/579
(58) Field of Search .................. 446/202, 207, 446/208, 209, 213; 144/115, 2 R, 144 R; 206/579; 269/152, 156; 29/281.1, 281.5

(56) References Cited

U.S. PATENT DOCUMENTS

| | | | |
|---|---|---|---|
| 1,351,148 | 8/1920 | Alexander . | |
| 2,460,679 | 2/1949 | Clay . | |
| 2,783,963 | 3/1957 | Kalberg . | |
| 3,835,594 | 9/1974 | Szulman . | |
| 4,026,535 | 5/1977 | Heath . | |
| 4,116,425 | 9/1978 | Pesola . | |
| 4,172,482 | * 10/1979 | Gomez | 144/363 |
| 4,221,075 | * 9/1980 | Gallagher | 446/202 |
| 4,310,986 | * 1/1982 | Jacobs | 144/2 R |
| 4,572,257 | * 2/1986 | Laker | 144/115 |
| 4,644,649 | * 2/1987 | Seaman et al. | 144/2 R |
| 4,648,852 | * 3/1987 | Wingate | 446/397 |
| 4,664,641 | * 5/1987 | Hearn et al. | 446/397 |
| 4,669,515 | 6/1987 | Trent . | |
| 4,708,182 | * 11/1987 | Laker | 144/115 |
| 4,752,270 | 6/1988 | Morton . | |
| 4,761,149 | 8/1988 | Laubach . | |
| 4,824,066 | 4/1989 | Smith . | |
| 4,846,753 | * 7/1989 | Langston | 446/397 |
| 4,955,845 | * 9/1990 | Piper | 446/397 |
| 5,030,159 | 7/1991 | Beer . | |
| 5,234,369 | 8/1993 | Forbes et al. . | |
| 5,241,793 | 9/1993 | Armato . | |
| 5,484,319 | * 1/1996 | Battey | 446/397 |
| 5,520,567 | * 5/1996 | Jacobsen | 446/207 |
| 5,615,719 | 4/1997 | Balon . | |
| 5,694,994 | * 12/1997 | Engler, III et al. | 144/286.1 |

* cited by examiner

Primary Examiner—Jacob K. Ackun, Jr.
Assistant Examiner—F. Francis
(74) Attorney, Agent, or Firm—Martin & Associates, L.L.C.; Derek P. Martin (57) ABSTRACT

A fixture, process and kit allow a user to construct game calls at home with little effort and at low cost. A kit that includes the fixture, call frames, and reeds provides the materials a person needs to construct game calls to custom specifications. The fixture includes a base block that is placed on a flat surface, such as a table. The base block includes a reed recess where one or more reeds are placed flat, one atop the other. Once the reed or reeds are in place, clamps are used to secure each end of the reed or reeds to the base block. Once the ends are secure, a tensioning rod is used to stretch the reed or reeds to the desired tension. Once the reed or reeds are to the desired tension, the bottom portion of a call frame is inserted into a frame recess in the base block by sliding the call frame under the reed or reeds. The top of the call frame is then bent down in close proximity to the bottom of the call frame, and the top and bottom of the call frame are then secured together to captivate the reed or reeds within the frame. Once secured, the clamps are loosened to release the reed or reeds, the call frame is removed from the fixture, and the excess reed material is trimmed from the call frame. The call frame with captivated reed or reeds may then be optionally covered with tape and trimmed to produce a call that a user can place in his or her mouth. In an optional step, the user can also selectively cut one or more of the reeds to provide different sound characteristics for the call.

19 Claims, 8 Drawing Sheets

FIXTURE, PROCESS AND KIT FOR MAKING A GAME CALL

BACKGROUND OF THE INVENTION

1. Technical Field

This invention generally relates to devices for calling wildlife, and more specifically relates to a fixture and process that allows a person to control the manufacturing parameters for a game call to produce calls that have different sounds.

2. Background Art

For centuries, hunters have used various different devices and methods for attracting game. One popular way to attract game is to use a calling device that creates sounds that attract the desired game. For example, a turkey call may be used to create the sounds of a female turkey, which attracts male turkeys. A coyote call may be used to create the sounds of a wounded animal, which attracts coyotes. Using a game call can create better opportunities for shooting prey when hunting.

One example of a known game call is disclosed in U.S. Pat. No. 4,752,270 "Game Call with Interchangeable Reed", issued on Jun. 21, 1988 to Morton. The Morton game call has a reed that can be removed and replaced as desired. By replacing the reed, different sounds can be created. A hunter can thus purchase a variety of different reeds, and can use the game call to produce different sounds by simply replacing the reed.

Another example of a known game call is disclosed in U.S. Pat. No. 5,234,369 "Animal Call and Methods of and Apparatus for Making Same" issued on Aug. 10, 1993 to Forbes et al. The Forbes game call has two horseshoe-shaped frame members that support pre-tensioned diaphragm material. This call is similar to calls known in the art that employ a horseshoe-shaped frame that captivates one or more pieces of diaphragm material. The frame and diaphragm material are typically covered with tape. The entire assembly can then be placed in a person's mouth, and with some practice, a person can learn to position the call in the mouth and blow air over the diaphragm material to create sounds that attract animals.

One of the principal advantages of the manufacturing process for the game call disclosed in the Forbes patent is that the tension on the reeds is precisely controlled in a repeatable manner, which makes it possible to produce a batch of game calls that will each perform similarly to the others produced to those same specifications. This uniformity is desirable when mass-producing a large number of calls. By tightly controlling the reed tension, the variability between calls in a batch and between calls in different batches can be reduced to a minimum. Less variability means that the game calls will have an improved degree of consistency of performance. In addition, by changing the specification of reed tension, different calls can be produced that will produce different sounds.

The call disclosed in Morton requires a hunter to purchase multiple reeds to provide different sounds. Similarly, the Forbes call has a specified tension in the reed (or reeds), which means that a hunter has to purchase multiple calls to produce different sounds. Even if a hunter has the available funds to purchase all of the available reeds for the Morton call or all of the different variations of Forbes calls, the hunter is still left with only off-the-shelf choices. If a user wants a reed tension that is tighter than the tightest tension provided in these off-the-shelf calls, there is no known way for the user to buy or construct a call to his or her custom specifications. Without a way for a person to construct game calls at home to custom specifications, a hunter will be limited to the off-the-shelf specifications provided by known game calls, resulting in excess cost if many different calls are needed and resulting in the inability to customize a call to produce a desired sound.

DISCLOSURE OF INVENTION

According to the present invention, a fixture, process and kit allow a user to construct game calls at home with little effort and at low cost. A kit that includes the fixture, call frames, and reeds provides the materials a person needs to construct game calls to custom specifications. The fixture includes a base block that is placed on a flat surface, such as a table. The base block includes a reed recess where one or more reeds are placed flat, one atop the other. Once the reed or reeds are in place, clamps are used to secure each end of the reed or reeds to the base block. Once the ends are secure, a tensioning rod is used to stretch the reed or reeds to the desired tension. Once the reed or reeds are to the desired tension, the bottom portion of a call frame is inserted into a frame recess in the base block by sliding the call frame under the reed or reeds. The top of the call frame is then bent down in close proximity to the bottom of the call frame, and the top and bottom of the call frame are then secured together to captivate the reed or reeds within the frame. Once secured, the clamps are loosened to release the reed or reeds, the call frame is removed from the fixture, and the excess reed material is trimmed from the call frame. The call frame with captivated reed or reeds may then be optionally covered with tape and trimmed to produce a call that a user can place in his or her mouth. In an optional step, the user can also selectively cut one or more of the reeds to provide different sound characteristics for the call.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

A kit in accordance with the preferred embodiments includes a fixture, call frames, and reed material. The call frames and reed material are assembled together using the fixture. With the kit, a do-it-yourselfer can easily create game calls to custom specifications at very low cost. The fixture and process for making a game call using the fixture also comprise embodiments of the present invention.

Figure 1:
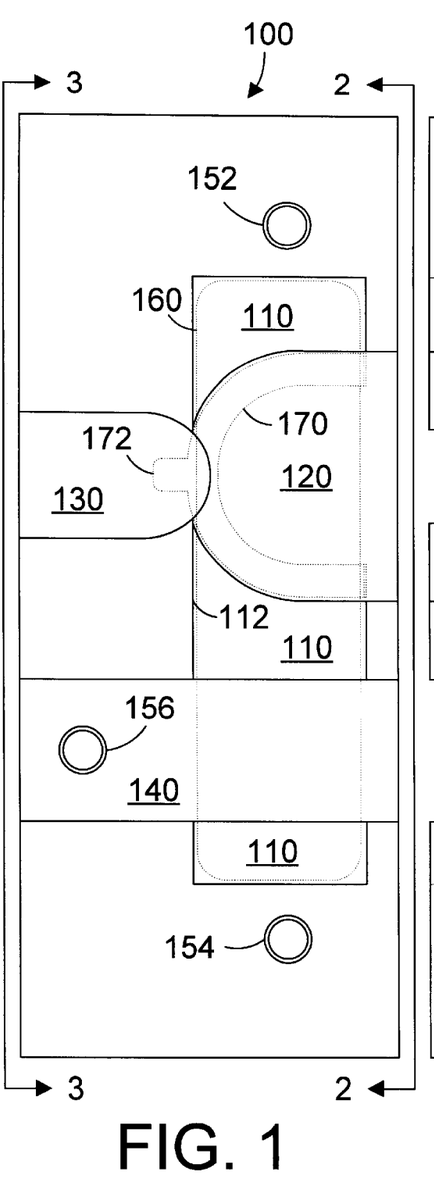
FIG. 1 is a top view of a base block that is part of a game call fixture in accordance with the preferred embodiments.
Figure 2:
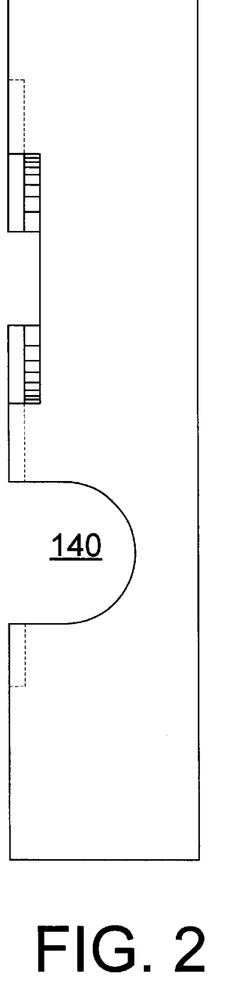
FIG. 2 is a side view of the base block of FIG. 1 taken along the lines 2—2.
Figure 3:
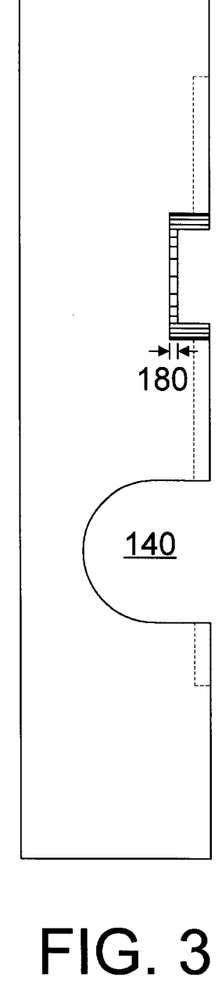
FIG. 3 is a side view of the base block of FIG. 1 taken along the lines 3—3.

Referring to FIGS. 1–3, a fixture in accordance with the preferred embodiments has a base block 100 that is used to assemble a game call in accordance with the preferred process disclosed herein. Base block 100 includes a first recess 110 that is substantially rectangular in shape for receiving a rectangular piece of diaphragm material that is referred to herein as a "reed" 160, shown in phantom in FIG. 1. For the sake of convenience in describing the preferred embodiments, the first recess 110 is referred to herein as a "reed recess".

Base block 100 also includes a second recess 120 that has a rounded shape on one end as shown in FIG. 1 to receive part of a call frame 170, shown in phantom in FIG. 1. Recess 120 is at a lower level than reed recess 110, and therefore partially underlies reed recess 110. For the sake of convenience, the second recess 120 is referred to herein as a "call frame recess". In the preferred embodiment, the call frame recess 120 has a depth from the bottom of the reed recess that is slightly greater than the thickness of the call frame 170. This allows a reed in the reed recess to lie flat on the call frame when the call frame is placed into the call frame recess 120. Of course, variations in the depth of the second recess are within the scope of the preferred embodiments.

A third recess 140 is included in base block 100 that partially underlies the reed recess 110. As shown in FIGS. 2 and 3, the third recess 140 is substantially rounded along its bottom, providing a cylindrical-like recess. Base block 100 includes tapped holes 152 and 154 for receiving screws that hold down clamp blocks, and a tapped hole 156 for receiving a screw that holds down a tensioning rod, as described below with reference to FIG. 15.

A fourth recess 130 is provided in base block 100 for convenience in clamping the two halves of a call frame together using the tab 172 shown in phantom. FIG. 1 shows part of a call frame 170 in phantom, with a tab 172 that extends into a "tab slot" so that it overlies the fourth recess 130. As shown in FIG. 3, recess 130 creates a space 180 into which a person's fingernail, a screwdriver, or other tool can be placed to bend tab 172 upward. In the process of the preferred embodiments, tab 172, which is part of a bottom portion of the call frame, is bent up and over the top portion of the call frame to securely fasten together the two portions of the call frame and to captivate the reed (or reeds) within the call frame. Fourth recess 130 provides a convenient way to perform the bending operation on the tab 172 of a call frame 170.

Figure 4:
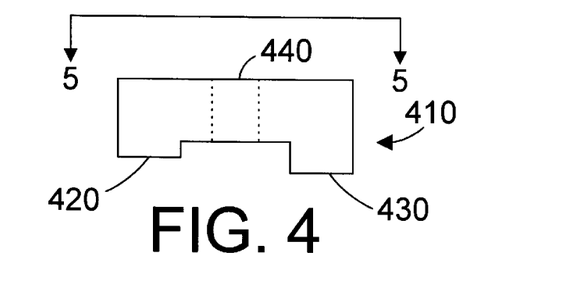
FIG. 4 is a side view of a clamp block in accordance with the preferred embodiments used to secure one or more reeds to the base block of FIG. 1.
Figure 5:
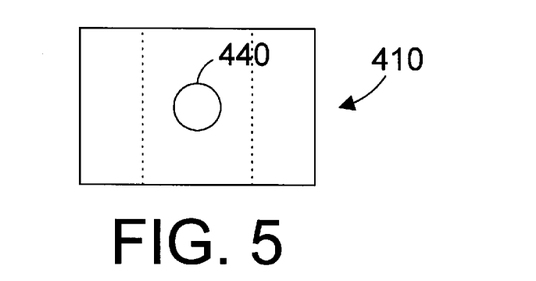
FIG. 5 is top view of the clamp block of FIG. 4.

Referring now to FIGS. 4 and 5, a fixture in accordance with the preferred embodiments includes two identical clamp blocks 410. Each clamp block 410 includes a short leg 420, a long leg 430, and a hole 440. The design of clamp block 410 allows a screw to be placed in hole 440 to fasten the clamp block 410 to the base block 100. When properly installed, long leg 430 is place within the reed recess 110, while short leg 420 sits on top of the base block 100. When the screw is tightened down to secure the clamp block 410, the end of any reeds in the reed recess 110 will be securely clamped to the base block.

The specific configuration of the clamp block 410 is shown by way of example to illustrate one suitable implementation in accordance with the preferred embodiments. One skilled in the art will recognize that other types and configurations of clamp mechanisms may be used. The preferred embodiments expressly extend to any suitable clamp mechanism for securing the end of one or more reeds to the base block 100.

Figures 6, 8:
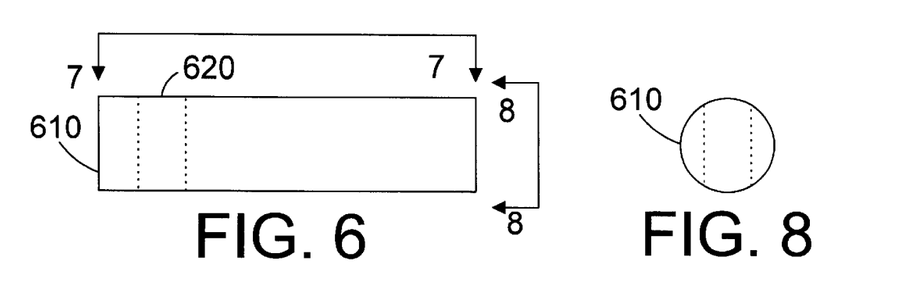
FIG. 6 is a side view of a tensioning rod in accordance with the preferred embodiments that is attached to the base block of FIG. 1 to create reed tension.
FIG. 8 is a side view of the tensioning rod of FIG. 6 taken along the lines 8—8.
Figure 7:
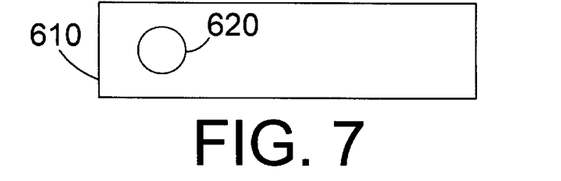
FIG. 7 is top view of the tensioning rod of FIG. 6 taken along the lines 7—7.

Referring now to FIGS. 6–8, a fixture in accordance with the preferred embodiments includes a tensioning rod 610 with a hole 620 for attaching the tensioning rod 610 to the base block 100. The specific configuration in FIGS. 6–8 shows a substantially cylindrical tensioning rod, which is the best mode for the tensioning rod 610. Note, however, that other configurations and designs for tensioning rod 610 are within the scope of the preferred embodiments. For example, the tensioning rod could be a bisected half cylinder shape, or could have a cross section that is triangular, square, rectangular, or in a shape with any suitable number of sides (e.g., pentagonal, hexagonal, etc.). Note also that the shape of recess 140 in FIGS. 1–3 can change according to the shape of the tensioning rod. In the best mode of the invention, the tensioning rod is cylindrical as shown in FIGS. 6–8, and recess 140 is rounded at the bottom to accommodate the curvature of the cylindrical tensioning rod. However, other shapes for both tensioning rod 610 and recess 140 may be used, and the shapes need not necessarily correspond. For one specific example, a cylindrical tensioning rod could be used in conjunction with a recess 140 that has a flat bottom. The preferred embodiments extend to any configuration of tensioning rod 610 and recess 140 that allows a portion of tensioning rod 610 to extend within recess 610 to a level that is lower than the bottom of the reed recess 110 in order to stretch (i.e., create tension) in one or more reeds.

Figure 9:
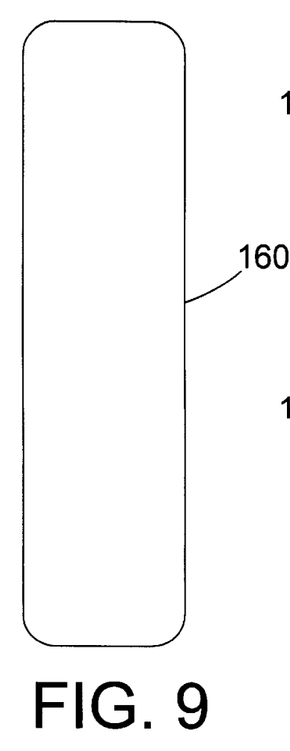
FIG. 9 is a plan view of a reed in accordance with the preferred embodiments.

One suitable configuration for a reed 160 is shown in FIG. 9. A reed 160 may be made of any suitable material that may be stretched to provide a desired tension. In the preferred embodiment, the reed is a flat, substantially rectangular piece of latex rubber, with a preferred thickness from 0.002 inch (0.05 mm) to 0.010 inch (0.025 mm), with a most preferred thickness of approximately 0.004 inch (0.10 mm). Note that multiple reeds may be used in constructing a call in accordance with the fixture and process of the preferred embodiments.

Figure 10:
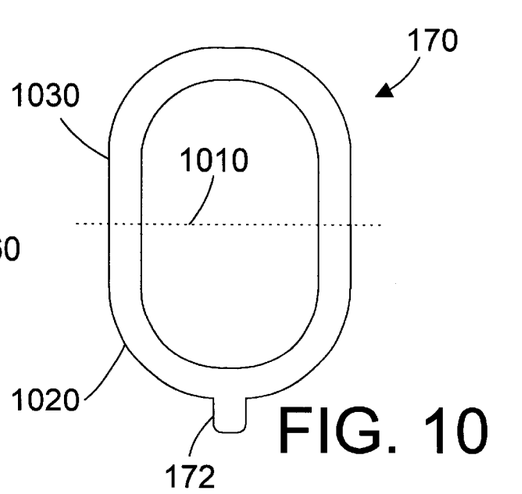
FIG. 10 is a plan view of a flat call frame.
Figure 11:
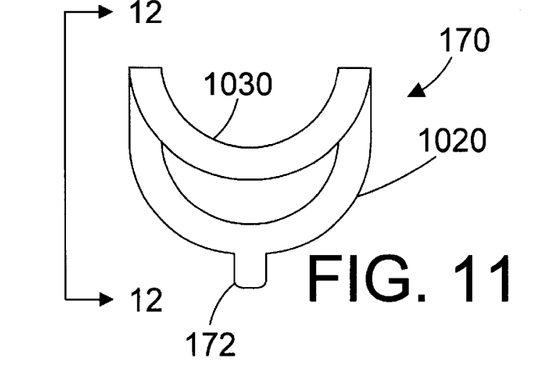
FIG. 11 is a top view of a call frame as shown in FIG. 10 that has been bent for use in the base block of FIG. 1.
Figure 12:
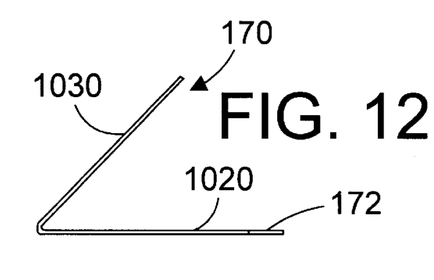
FIG. 12 is a side view of the call frame of FIG. 11 taken along the lines 12—12.
Figure 13:
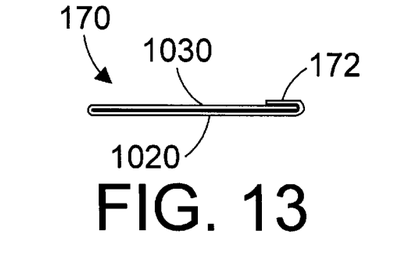
FIG. 13 is a side view of a call frame, such as that in FIG. 12, once assembled to captivate the reeds between the top and bottom portions of the call frame.

A call frame 170 is illustrated in FIG. 10. Call frame 170 is preferably made of metal, and is most preferably stamped from sheet aluminum in the shape shown in FIG. 10, with a tab 172. In the alternative, call frame 170 may also be made of plastic, where the two halves of the call frame 170 are held together via tight-fitting pins and sockets that are molded into the plastic halves. Of course, other suitable materials for call frame 170 may also be used within the scope of the preferred embodiments. In preparing the call frame 170 for use with the fixture of the preferred embodiments, call frame 170 is preferably bent along a line 1010 in FIG. 10 to define an upper portion 1030, and a lower portion 1020 that includes tab 172. In the specific embodiment illustrated in FIGS. 11 and 12, top portion 1030 is bent at a 45 degree angle with respect to bottom portion 1020. However, the angle is not critical, and any angle of bend (or no bend at all) could be used within the scope of the preferred embodiments. The call frame 170 can then be place within the call frame recess 120 of the base block 100 underlying one or more reeds, and when the top portion 1030 is bent down to meet the bottom portion 1020, the reed or reeds will be captivated between the top portion 1030 and the bottom portion 1020 of the call frame. The tab 172 may then be bent up and over the top portion 1030 to secure the two portions 1020 and 1030 together, as shown in FIG. 13.

Figure 14A:
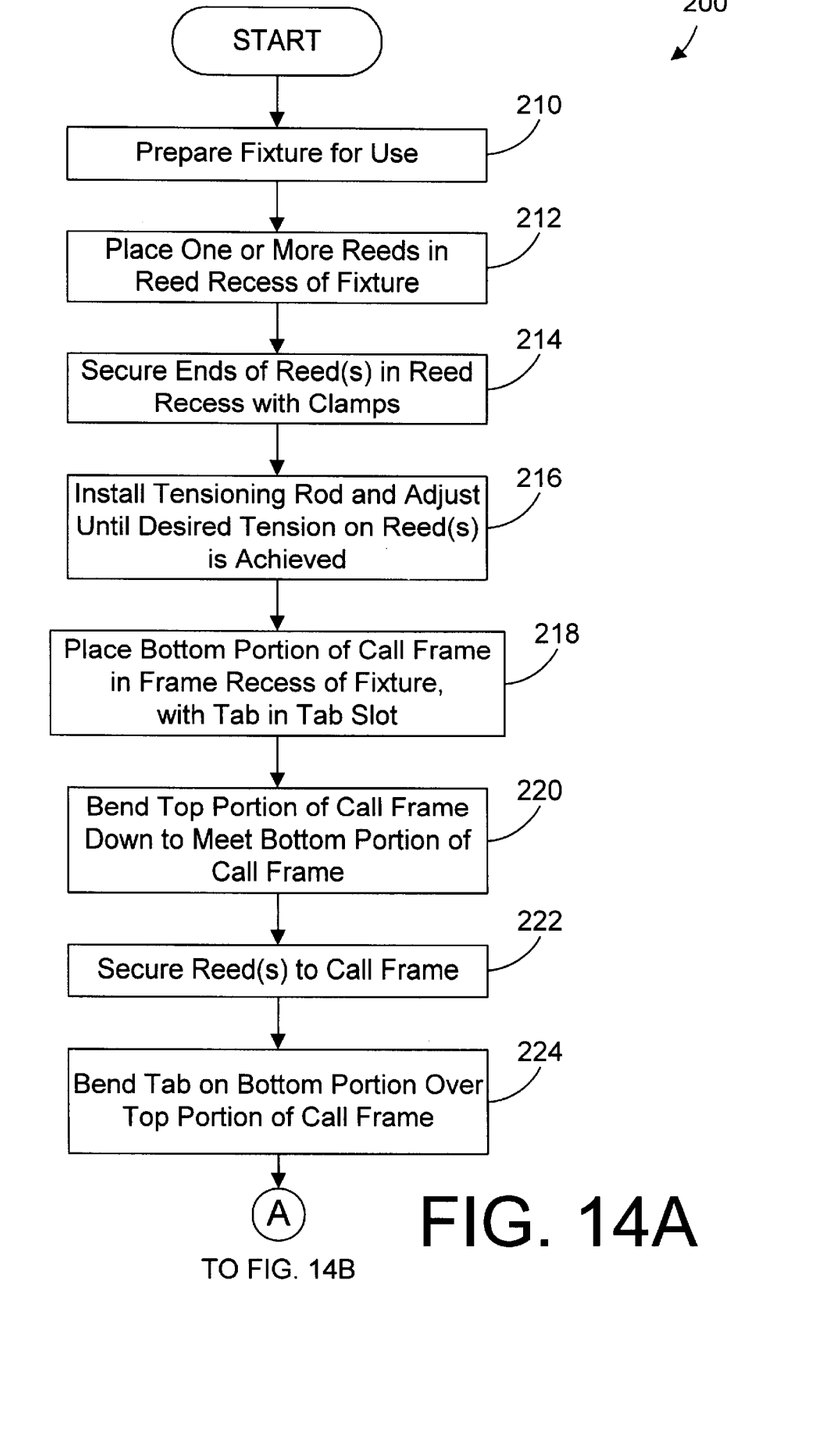
FIGS. 14A and 14B are parts of a flow diagram of a process for making a game call using the fixture in accordance with the preferred embodiments.
Figure 14B:
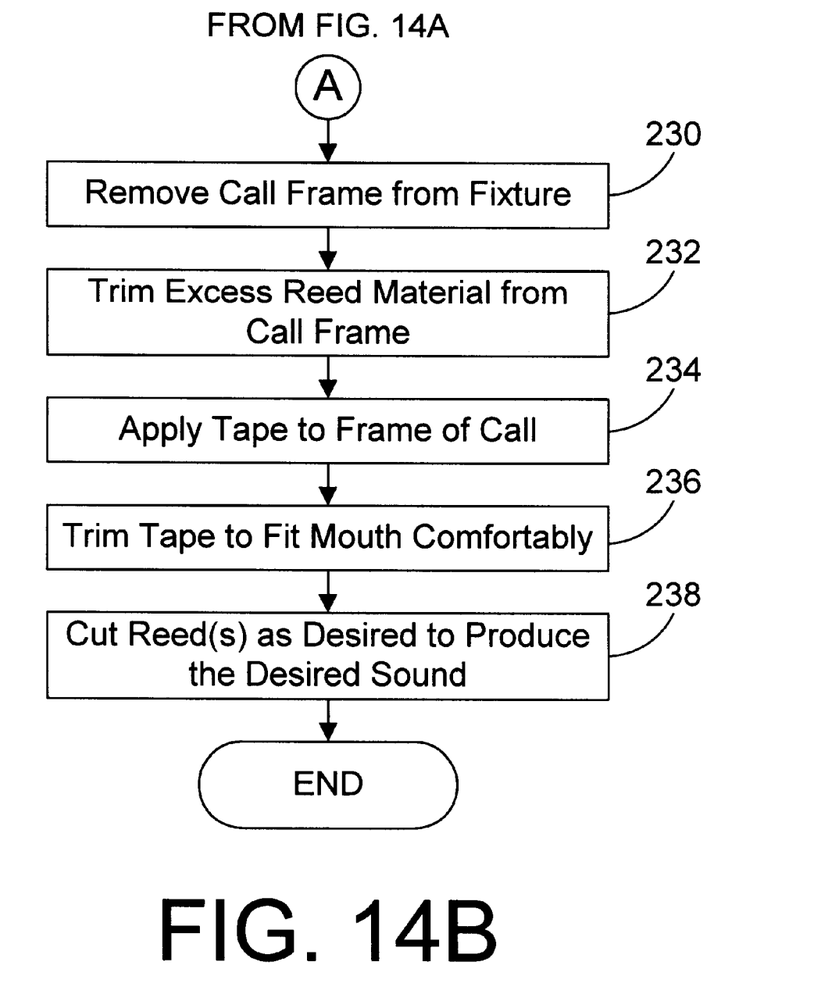

Referring now to FIGS. 14A and 14B, a fixture in accordance with the preferred embodiments is used to fabricate a game call in a process 200. The steps of process 200 may best be understood with reference to the exploded view of the fixture 1500 in FIG. 15. First, the fixture 1500 is prepared for use (step 210). In preparing the fixture for use, the clamp blocks 410A and 410B, and tensioning rod 610 are preferably removed from the base block 100 by removing the thumbscrews 252, 254 and 256 from their respective tapped holes 152, 154 and 156 in the base block 100. In the alternative, the clamp blocks and tensioning rod may be loosed rather than removed. Once the fixture is prepared for use, one or more reeds are placed in the reed recess 110 of the base block (step 212). If multiple reeds are used, each reed is preferably a different width, with the widest reed placed first into the reed recess 110 followed by the others in succession to the narrowest reed. Each reed when placed within reed recess 110 is preferably pushed towards the edge 112 (FIG. 1) of reed recess 110, so the edges of all reeds align along the edge 112, while the other edges of the reeds are staggered according to the different widths of the reeds. Reed 160 shown in FIG. 15 represents a single reed or multiple reeds in a stack as described above.

Figure 15:
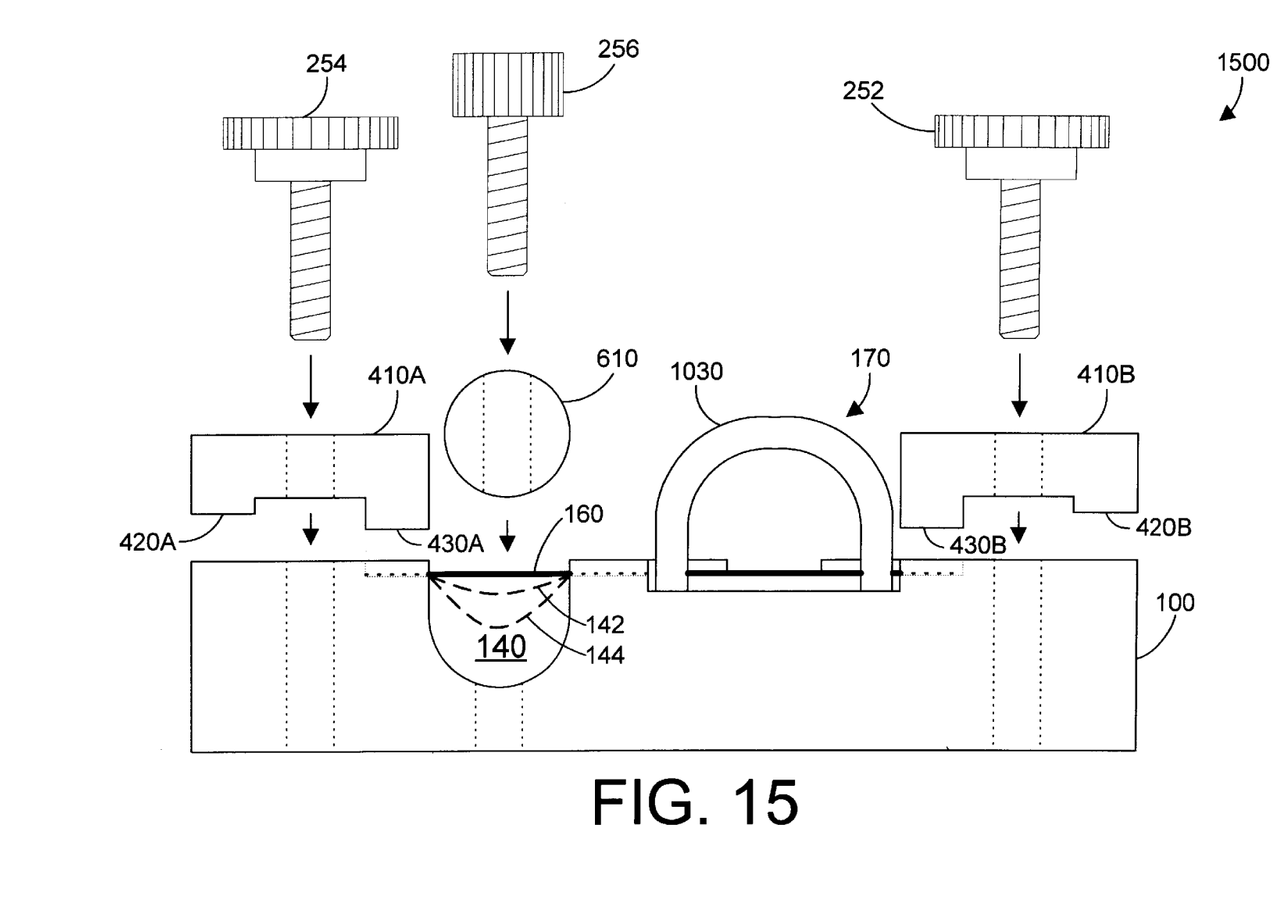
FIG. 15 is an exploded side view of the fixture in accordance with the preferred embodiments to illustrate the use of the fixture to make a game call.

Once all reeds are placed within the reed recess 110, the ends of the reeds are secured to the base block (step 214), preferably using the clamp blocks 410A and 410B shown in FIG. 15. Clamp blocks 410A and 410B are positioned so their long legs 430A and 430B rest atop the reed (or reeds) 160 within the reed recess 110, as shown in FIG. 15. Their short legs 420A and 420B rest on the top of the base block 100. When screws 252 and 254 are placed through the holes in clamp blocks 430B and 430A and screwed into their respective tapped holes 152 and 154 of the base block until tight, the downward pressure from the screw causes the long leg of the clamp blocks to put pressure on the reed or reeds, thereby captivating the reed or reeds in place.

Now that the reeds are secured within the reed recess of the base block, the tensioning rod is installed and adjusted until a desired tension on the reed or reeds is achieved (step 216). Referring to FIG. 15, this is accomplished by placing screw 256 through hole 620 of tensioning rod 610 and screwing screw 256 into the tapped hole 156 of the base block 100. As screw 256 is tightened, tensioning rod 610 begins to press on reed or reeds 160 and stretches the reed or reeds, as shown by the phantom lines 142 and 144 in recess 140 of FIG. 15. The screw 256 may be adjusted to achieve any desired tension on the reeds, up to the maximum tension which occurs when the screw 256 is tightly screwed all the way in so that tensioning rod 610 rests on the bottom of the recess 140.

Once the desired tension on the reeds is achieved, a call frame 170 is then inserted into the call frame recess 120 (step 218), with its tab 172 extending into the tab slot provided by recess 130, as shown in FIG. 1. The top portion 1030 is then bent down to meet up with the bottom portion 1020 (step 220). The reeds are then secured to the call frame (step 222). One suitable way of securing the reeds to the call frame is to position a striker pin above the bends on the call frame and to strike the striker pin with a hammer to eliminate any gaps that might exist between the two halves of the call frame 170. This process is repeated for both bends in the call frame. Tapping the bends creates a tighter joint between the top and bottom portions of the call frame, thereby putting pressure on the reed or reeds 160 and captivating them within the call frame 170. One suitable striker pin is a cylindrical piece of aluminum rod, sufficient in diameter to cover a bend in a call frame and sufficient in length that a person can hold the striker pin with the fingers of one hand while tapping on the pin with a hammer held in the other hand. Of course, a striker pin with a smaller diameter or shorter length could also be used.

The tab 172 of the bottom portion 1020 can then be bent up and over the top portion 1030 of the call frame (step 224) to lock the two portions of the call frame together. The striker pin and hammer may also be used to tighten the tab 172 after bending it over the top portion 1030. At this point, assembly of the reeds to the call frame is complete. Referring now to FIG. 14B, the call frame 170 with its captivated reed or reeds can be removed from the fixture (step 230) by removing or loosening clamp blocks 410A and 410B and tensioning rod 610. The reed material that extends beyond the call frame is then trimmed off (step 232), preferably with scissors. At this point tape is applied to the call frame (step 234) and trimmed to fit a person's mouth comfortably (step 236). The call is now complete. Note that an optional step 238 may also be performed to cut one or more of the reeds to produce a desired sound.

Figure 16:
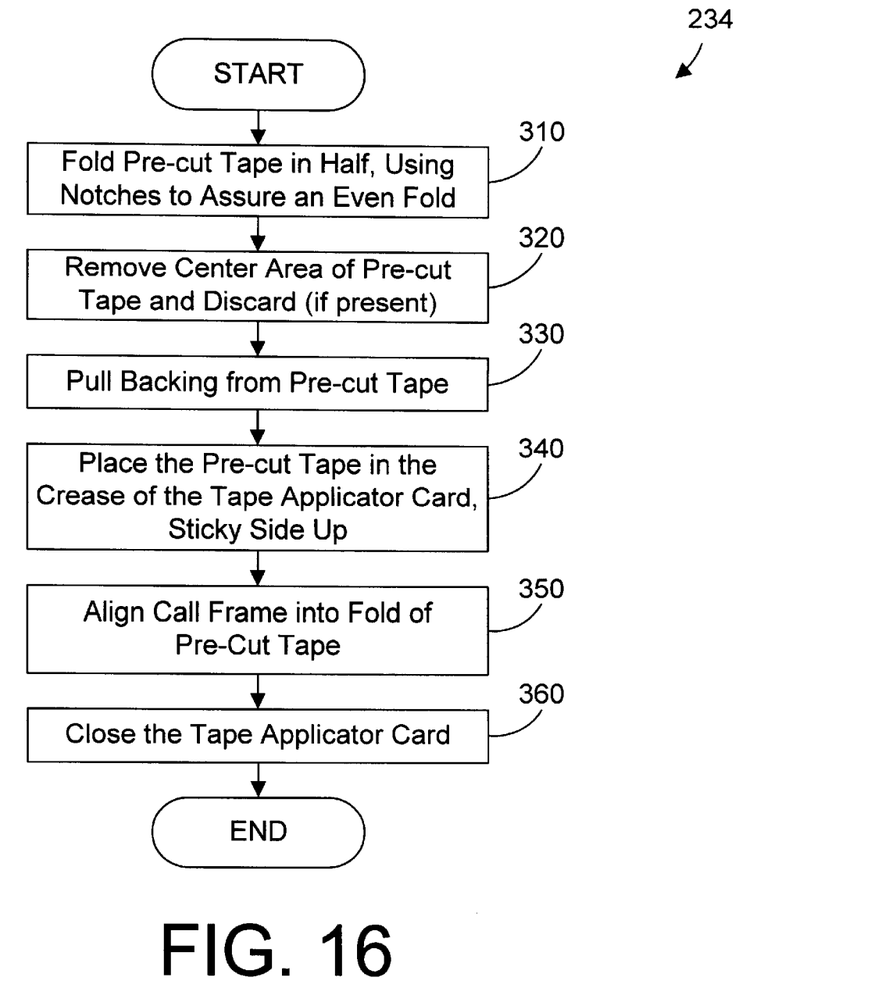
FIG. 16 is a flow diagram of step 234 in FIG. 14B illustrating steps in accordance with the preferred embodiments for applying tape to the call frame.
Figure 17:
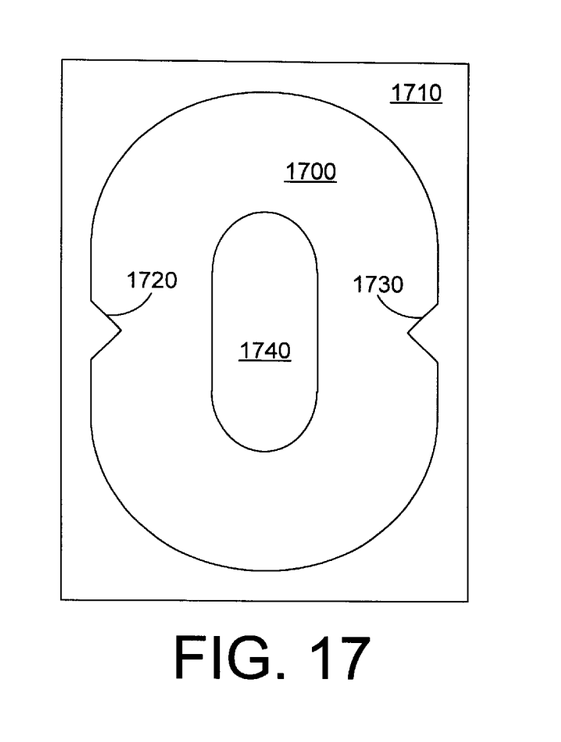
FIG. 17 is a plan view of a piece of pre-cut tape that is used to surround the call frame for placement in a person's mouth.
Figure 18:
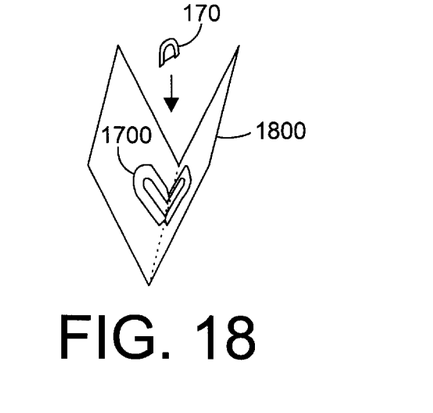
FIG. 18 is a perspective view of a tape applicator card that is used to apply the pre-cut tape of FIG. 17 to a call frame.

Referring now to FIG. 16, the steps for one suitable process for applying the tape to the call frame in step 234 of FIG. 14B in accordance with the preferred embodiments are shown. This process assumes the use of pre-cut tape. One suitable configuration of pre-cut tape is shown in FIG. 17, with the tape portion 1700 having a backing piece 1710 that covers the adhesive (or sticky) side of the tape portion 1700. First, the pre-cut tape 1700 is folded in half, using the notches 1720 and 1730 as the fold line to assure an even fold (step 310). This fold is made in a direction so the backing 1710 is folding on itself. Next, if the center 1740 of the pre-cut tape has tape material, the center portion is removed (step 320). Of course, this step is not needed if the pre-cut tape only has backing in center 1740. Next, the backing is pulled from the pre-cut tape (step 330). An applicator card 1800 is used to position the call frame 170 within the pre-cut tape 1700, as shown in FIG. 18. Applicator card 1800 is preferably a heavy card-stock paper with a sharp fold. A manilla file folder works well as an applicator card. A 3"×5" (7.6 cm×12.7 cm) index card is preferably used as applicator card 1800. The pre-cut tape 1700 is positioned so the fold in the tape lies along the fold in the applicator card 1800, with the sticky side of the pre-cut tape facing up (step 340). The call frame 170 with its captivated reed or reeds is then positioned on the pre-cut tape 1700 by placing the bends in the call frame at the fold in the pre-cut tape (step 350). With the call frame correctly positioned, the applicator card 1800 is closed along its fold, which causes the sticky parts of the precut tape 1700 to adhere to the opposing sticky parts, with the call frame 170 captivated in between. Using pre-cut tape and an applicator card as described above is an easy way for a do-it-yourselfer to place tape on a game call that is manufactured using the fixture of the preferred embodiments.

Figure 19:
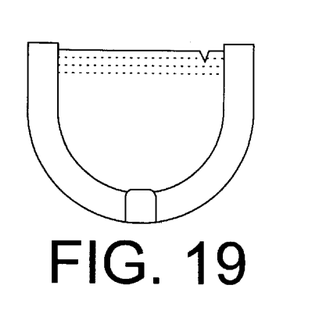
FIG. 19 is a plan view of a call frame showing modification of the reed (or reeds) to produce the sound of a raspy turkey hen.
Figure 20:
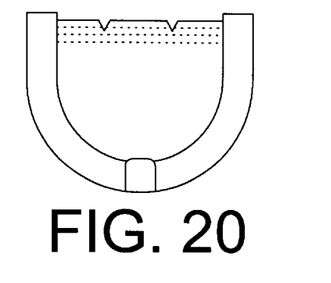
FIG. 20 is a plan view of a call frame showing modification of the reed (or reeds) to produce the sound of a turkey hen that is more raspy than the sound produced by the call in FIG. 19.
Figure 21:
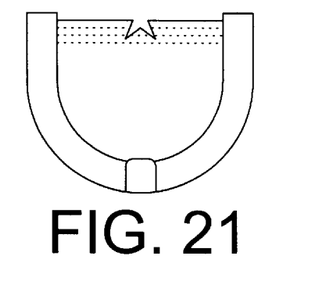
FIG. 21 is a plan view of a call frame showing modification of the reed (or reeds) to produce a yelping sound.
Figure 22:
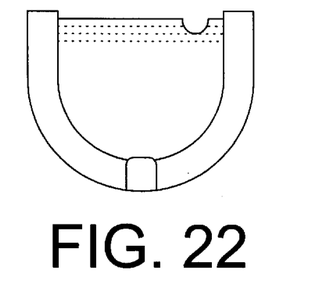
FIG. 22 is a plan view of a call frame showing modification of the reed (or reeds) to produce a clucking call.

Step 238 in FIG. 14B is an optional step that allows a person to cut one or more of the reeds to produce a desired sound. Examples of different types of cuts are shown in FIGS. 19–22. In FIG. 19, a single notch is cut in the reed (or reeds) near the call frame to produce a raspy sound of a female turkey. In FIG. 20, two notches are cut, which produces a raspier sound. The cut pattern in FIG. 21 produces a yelping call. The cut pattern in FIG. 22 produces a clucking call. Of course, numerous other different patterns could be cut into the reeds to produce various different sounds. Step 238 expressly extends to any modification of any reed. Note that step 238 could be performed on one or more individual reeds before assembling the reeds into a call frame using the fixture of the present invention.

A kit in accordance with the preferred embodiments contains the fixture, call frames and reeds. The kit could also optionally contain pre-cut tape, an applicator card, a striker pin for tapping the bends on call frames when in the fixture, and fabrication instructions. One specific implementation 1500 for a fixture in accordance with the preferred embodiments is shown in FIG. 15, and includes base block 100, clamp blocks 410A and 410B, a tensioning rod 610, and screws 252, 254, and 256. Of course, other configurations for the fixture are possible within the scope of the preferred embodiments.

While the invention has been particularly shown and described with reference to preferred embodiments thereof, it will be understood by those skilled in the art that various changes in form and details may be made therein without departing from the spirit and scope of the invention. For example, the specific example in the figures should not be construed as limiting. The preferred embodiments extend to any mechanism for clamping two ends of a reed, and to any mechanism for stretching the reed to provide a desired tension in the reed before captivating the reed in a call frame. In addition, the shape and size of the reeds and call frames can vary, which will result in different shapes of recesses in the base block.

What is claimed is:

1. A fixture for fabricating a game call that includes a call frame and at least one reed, the fixture comprising:
    (A) a base block, the base block including:
        a first recess configured to receive at least one reed that is laid substantially flat, each reed having first and second ends;
        a second recess partially underlying the first recess, the second recess configured to receive the bottom portion of a call frame that is positioned under the at least one reed in the first recess;
        a third recess at least partially underlying the first recess, the third recess configured to receive a tensioning rod;
    (B) first and second clamp mechanisms attached to the base block, the first and second clamp mechanisms positioned to secure the first and second ends of the at least one reed to the base block; and
    (C) a tensioning rod attached to the base block using an adjustable attachment mechanism that allows adjusting the position of the tensioning rod in the third recess, thereby providing a desired tension on the at least one reed in the first recess by adjusting the adjustable attachment mechanism.

2. The fixture of claim 1 wherein the first recess is substantially rectangular.

3. The fixture of claim 1 wherein the second recess has a substantially rounded portion for receiving a horseshoe-shaped call frame.

4. The fixture of claim 1 wherein the tensioning rod is substantially cylindrical.

5. The fixture of claim 4 wherein the third recess has a substantially rounded bottom portion for receiving the substantially cylindrical tensioning rod.

6. The fixture of claim 1 further comprising first and second screws for releasably attaching the first and second clamp mechanisms to the base block.

7. The fixture of claim 1 wherein the adjustable attachment mechanism for the tensioning rod comprises a screw that passes through a hole in the tensioning rod.

8. A fixture for fabricating a game call that includes a call frame and at least one reed, the fixture comprising:
    (A) a base block, the base block including:
        a first recess configured to receive at least one reed that is laid substantially flat, each reed having first and second ends;
        a second recess partially underlying the first recess, the second recess configured to receive the bottom portion of a call frame that is positioned under the at least one reed in the first recess;
        a third recess at least partially underlying the first recess, the third recess configured to receive a tensioning rod;
    (B) means for securing the first and second ends of the at least one reed to the base block; and
    (C) means for adjusting the position of the tensioning rod in the third recess, thereby providing a desired tension on at least one reed in the first recess.

9. A process for fabricating a game call, the process comprising the steps of:
    placing at least one reed having first and second ends in a first recess in a base block;
    securing the first and second ends of the at least one reed to the base block; applying tension to the at least one reed to provide a desired reed tension; placing the bottom portion of a call frame in a second recess that partially underlies the first recess so the bottom portion of the call frame is under the at least one reed;
    placing the top portion of the call frame over the bottom portion of the call frame; and
    attaching the top portion of the call frame to the bottom portion to captivate the at least one reed between the top and bottom portions.

10. The process of claim 9 further comprising the steps of:
   trimming the portion of the at least one reed that extends beyond the call frame;
   placing tape on the call frame; and
   trimming the tape on the call frame.

11. The process of claim 9 wherein the step of placing tape on the call frame comprises the steps of:
   folding pre-cut tape in half, wherein the pre-cut tape has a backing that is removed to reveal a sticky side of the pre-cut tape;
   removing the backing from the pre-cut tape;
   placing the folded pre-cut tape in the crease of a tape applicator card, sticky side up;
   aligning the call frame into the fold of the pre-cut tape; and
   closing the tape applicator card to apply the pre-cut tape to the call frame.

12. The process of claim 9 wherein the step of applying tension to the at least one reed comprises the step of adjusting a tensioning rod to stretch the at least one reed to the desired reed tension.

13. The process of claim 9 wherein the step of adjusting the tensioning rod comprises the step of adjusting the position of the tensioning rod within a third recess at least partially underlying the first recess.

14. The process of claim 9 further comprising the step of cutting at least one reed to produce a desired sound.

15. The process of claim 9 wherein the step of attaching the top portion of the call frame to the bottom portion comprises the step of tapping on at least one bend in the call frame.

16. The process of claim 15 wherein the step of attaching the top portion of the call frame to the bottom portion further comprises the step of bending a tab on the bottom portion of the call frame over part of the top portion of the call frame.

17. A kit for fabricating a game call, the kit comprising:
(1) a fixture comprising:
   (1A) a base block, the base block including:
      a first recess configured to receive at least one reed that is laid substantially flat, each reed having first and second ends;
      a second recess partially underlying the first recess, the second recess configured to receive the bottom portion of a call frame that is positioned under the at least one reed in the first recess;
      a third recess at least partially underlying the first recess, the third recess configured to receive a tensioning rod;
   (1B) first and second clamp mechanisms attached to the base block, the first and second clamp mechanisms positioned to secure the first and second ends of the at least one reed to the base block;
   (1C) a tensioning rod attached to the base block using an adjustable attachment mechanism that allows adjusting the position of the tensioning rod in the third recess, thereby providing a desired tension on the at least one reed in the first recess by adjusting the adjustable attachment mechanism;
(2) a plurality of reeds that fit within the first recess when laid substantially flat;
and
(3) a plurality of call frames, a portion of each call frame fitting within the second recess.

18. The kit of claim 17 further comprising a plurality of pre-cut tapes dimensioned to fit over a call frame.

19. The kit of claim 17 further comprising a striker pin that is used to tap on a bend in the call frame to captivate the at least one reed between the bottom portion of a call frame to the top portion of the call frame.

* * * * *